United States Patent
Lim

(10) Patent No.: US 9,167,116 B2
(45) Date of Patent: Oct. 20, 2015

(54) IMAGE FORMING APPARATUS FOR CONTROLLING AN IMAGE FORMING JOB INPUT IN AN OFFLINE STATE AND CONTROLLING METHOD THEREOF

(71) Applicant: Samsung Electronics Co., Ltd, Suwon-si, Gyeonggi-do (KR)

(72) Inventor: Jong-yoon Lim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 14 days.

(21) Appl. No.: 13/906,544

(22) Filed: May 31, 2013

(65) Prior Publication Data

US 2014/0118772 A1     May 1, 2014

(30) Foreign Application Priority Data

Oct. 29, 2012 (KR) .......................... 10-2012-0120719

(51) Int. Cl.
    *H04N 1/00*           (2006.01)
    *G03G 15/00*         (2006.01)
    *G06F 3/12*             (2006.01)
    *G06F 21/60*         (2013.01)

(52) U.S. Cl.
CPC ......... *H04N 1/00877* (2013.01); *G03G 15/553* (2013.01); *G06F 3/1204* (2013.01); *G06F 3/1239* (2013.01); *G06F 3/1285* (2013.01); *G06F 21/608* (2013.01)

(58) Field of Classification Search
None
See application file for complete search history.

(56) References Cited

U.S. PATENT DOCUMENTS

| | | | |
|---|---|---|---|
| 6,999,190 B2 * | 2/2006 | Shimbori et al. | 358/1.15 |
| 7,190,484 B2 * | 3/2007 | Sugino | 358/1.9 |
| 8,400,661 B2 * | 3/2013 | Grasso et al. | 358/1.15 |
| 2012/0191601 A1 * | 7/2012 | Yoshida | 705/40 |

OTHER PUBLICATIONS

Extended European Search Report dated Apr. 25, 2014 issued in EP Application No. 13189111.1

* cited by examiner

*Primary Examiner* — Jeremiah Bryar
(74) *Attorney, Agent, or Firm* — Staas & Halsey LLP

(57) ABSTRACT

An image forming apparatus and a controlling method thereof are provided. The image forming apparatus includes a communication interface unit which is connected to a server where on-line output quota information set for each user is stored, a storage unit which stores off-line output quota information received from the server, a controller which, when a job command is input in an on-line state where communication with the server is available, determines whether to perform a job based on on-line output quota information stored in the server, and when the job command is input in an off-line state where communication with the server is cut off, determines whether to perform a job based on the off-line output quota information stored in the storage unit, and an image forming unit which, when job performance is determined by the controller, performs an image forming job corresponding to the job command.

11 Claims, 9 Drawing Sheets

FIG. 4

| User/Acc.. | User Name | Quota Plan | Plan Status | Copy[color] | Copy[Mono] | Print[Color] | Print[Mono] | Scan | Fax |
|---|---|---|---|---|---|---|---|---|---|
| User 1 | | Default User Plan | | 0/10000 | 0/10000 | 0/10000 | 0/10000 | 0/10000 | 0/10000 |
| User Info | Schedule Plan | | Edit Info | | | | | | |
| Detailed User Information<br><br>Account : User 1<br>User name :    Email :<br>Group name : Ungrouped    Phone :<br>                         Department :<br>                         Position : | | | | | | | | | |
| admin | | Default Administ.. | Default User Plan | 0/10000 | 0/10000 | 0/10000 | 0/10000 | 0/10000 | 0/10000 |
| User3 | | | Default User Plan | 0/10000 | 0/10000 | 0/10000 | 0/10000 | 0/10000 | 0/10000 |
| User4 | dfafa | | Default User Plan | 0/10000 | 0/10000 | 0/10000 | 0/10000 | 0/10000 | 0/10000 |

Quota Policy Settings
Configure the quota policy. All devices will be influenced by the changed policies.

| Off-line Policy | | | |
|---|---|---|---|
| ☐ | All functions | | ☐ Unlimited |
| ☑ | Copy color | 500 | ☐ Unlimited |
| ☑ | Copy mono | 500 | ☐ Unlimited |
| ☑ | Print color | 500 | ☐ Unlimited |
| ☑ | Print mono | 500 | ☐ Unlimited |
| ☑ | Fax | 500 | ☐ Unlimited |
| ☑ | Scan | 500 | ☐ Unlimited |

FIG. 7

| New | Status | Toner | Host Name | MAC Address | IP Address | Model Name | Quota Agent s... |
|---|---|---|---|---|---|---|---|
| ☐ | △ | K2 C4 M25 Y19 | SEC0015998O5BDE | 00:15:99:80:5B:DE | 10.88.198.241 | Samsung CLP... | True |
| ☐ | △ | K1 C1 M1 Y1 | SEC0015991E6AB4 | 00:15:99:1E:6A:B4 | 10.88.193.181 | Samsung CLP... | True |
| ☐ | ⊘ | K76 | SEC0015991E8315 | 00:15:99:1E:83:15 | 10.88.198.249 | Samsung SCX... | False |
| ☐ | ⊘ | K82 C84 M93 Y89 | SEC00159994D72CA | 00:15:99:4D:72:CA | 10.88.198.219 | Samsung CLX... | False |
| ☐ | ⊘ | K58 C24 M42 Y55 | SEC001599A5488F | 00:15:99:45:48:8F | 10.88.196.241 | Samsung CLX... | False |
| ☐ | ⊘ | K81 | SEC00159994D7290 | 00:15:99:4D:72:90 | 10.88.196.149 | Samsung CLX... | False |
| ☐ | △ | K1 C1 M1 Y33 | SEC00159995B95C0 | 00:15:99:5B:95:C0 | 10.88.196.234 | Samsung CLX... | False |

701

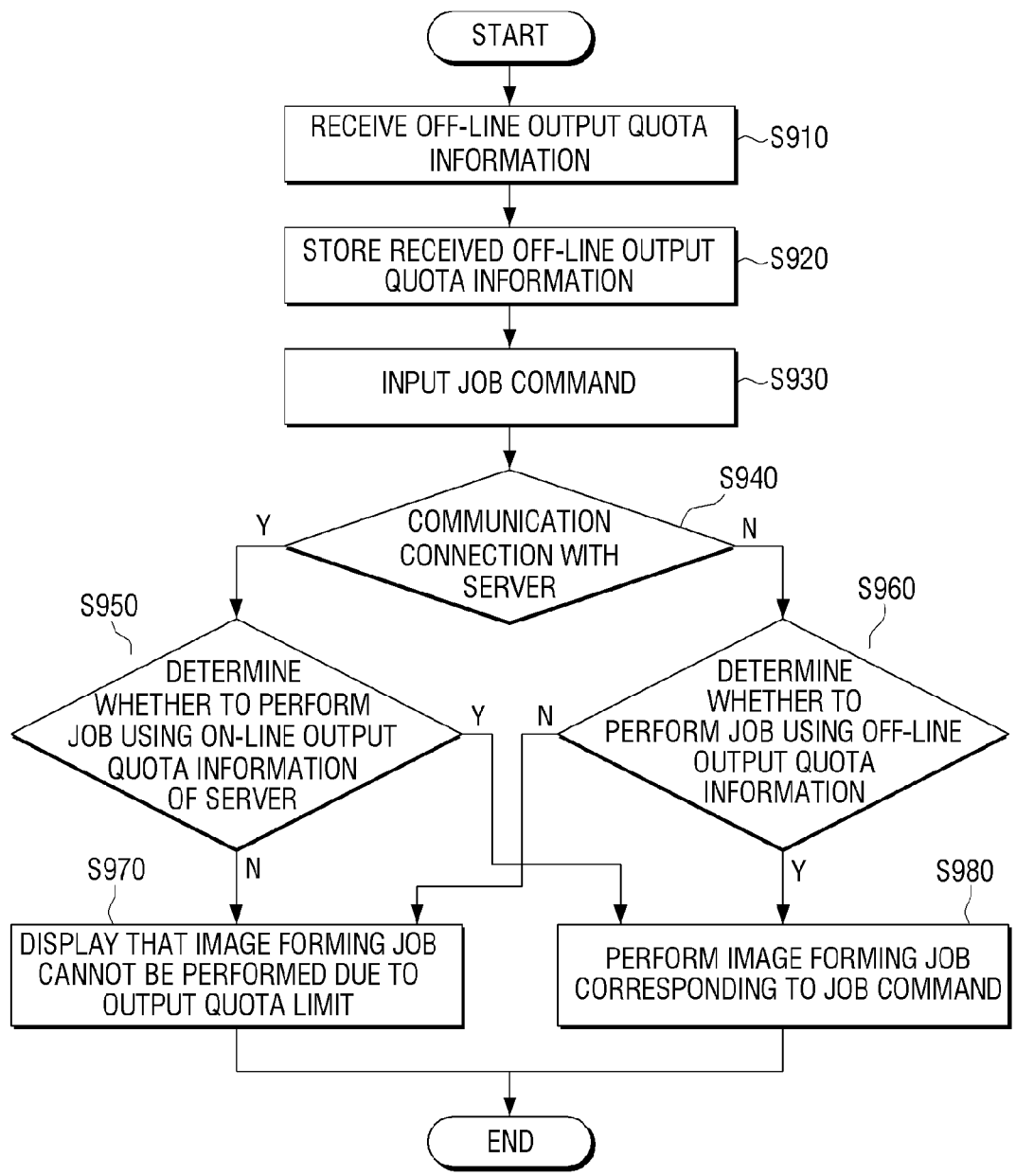

IMAGE FORMING APPARATUS FOR CONTROLLING AN IMAGE FORMING JOB INPUT IN AN OFFLINE STATE AND CONTROLLING METHOD THEREOF

CROSS-REFERENCE TO RELATED APPLICATIONS

This application claims the benefit of Korean Patent Application No. 2012-0120719, filed in the Korean Intellectual Property Office on Oct. 29, 2012, the content of which is incorporated herein by reference in its entirety.

BACKGROUND OF THE INVENTION

1. Field of the Invention

The present general inventive concept relates to an image forming apparatus and a controlling method thereof, and more particularly, to an image forming apparatus capable of controlling an image forming job using off-line output quota information when a job command is input in an offline state where connection to a server is cut off, and a controlling method thereof.

2. Description of the Related Art

An image forming apparatus refers to an apparatus which prints print data generated by a terminal apparatus such as a computer on a recording paper, and examples of an image forming apparatus include copy machine, printer, fax machine, and a Multi-Function Peripheral (MFP) which performs the above functions in a single device.

An image forming apparatus may be connected to a server which manages output quota in order to limit output quota for each user. Such a system is referred to as a Managed Printing Service of Solution (MPS) system which manages a printer of a network, an image forming apparatus like an MFP, and operation logs therein (for example, printing, copying, faxing, scanning, and so on) and processes business logic such as the amount of usage of each individual and group, charging thereof, and so on by using a quota management function.

In the conventional MPS system environment, if the connection between the server which manages output quota and the image forming apparatus is cut off, a user may be allowed to perform an output operation without limit, regardless of output quota allocated to each user, or an output operation is prohibited, causing inconvenience to the corresponding user.

SUMMARY OF THE INVENTION

A present general inventive concept provides an image forming apparatus capable of controlling an image forming job using off-line output quota information when a job command is input in an offline state where connection to a server is cut off, and a controlling method thereof.

Additional features and utilities of the present general inventive concept will be set forth in part in the description which follows and, in part, will be obvious from the description, or may be learned by practice of the general inventive concept.

Exemplary embodiments of the present inventive concept provide an image forming apparatus that includes a communication interface unit which is connected to a server where on-line output quota information set for each user is stored, a storage unit which stores off-line output quota information received from the server, a controller which, when a job command is input in an on-line state where communication with the server is available, determines whether to perform a job based on on-line output quota information stored in the server, and when the job command is input in an off-line state where communication with the server is cut off, determines whether to perform a job based on the off-line output quota information stored in the storage unit, and an image forming unit which, when job performance is determined by the controller, performs an image forming job corresponding to the job command.

The on-line output quota information and the off-line output quota information may include information regarding an amount of usage, and an available amount of usage.

The controller, when communication with the sever becomes available again after an image forming job is performed based on the off-line output quota information in the off-line state where communication with the server is cut off, may update output quota in the server in accordance with the performed image forming job and initialize the off-line output quota information.

The off-line output quota information may be categorized according to type of job command.

The controller, when an available amount of usage is not enough for a type of an input job command, may determine whether to perform a job by replacing the available amount with that of another type of job command included in the off-line output quota information.

The controller may update the on-line output quota information in the storage unit and the server whenever a predetermined amount of an image forming job is performed.

Exemplary embodiments of the present inventive concept also provide method of controlling an image forming apparatus that includes connecting to a server where on-line output quota information set for each user is stored, storing off-line output quota information received from the server, when a job command is input in an on-line state where communication with the server is available, determining whether to perform a job based on on-line output quota information stored in the server, and when the job command is input in an off-line state where communication with the server is cut off, determining whether to perform a job based on the off-line output quota information stored in the storage unit, and when job performance is determined by the controller, performing an image forming job corresponding to the job command.

The on-line output quota information and the off-line output quota information may include information regarding an amount of usage, and an available amount of usage.

The method may further include, when communication with the sever becomes available again after an image forming job is performed based on the off-line output quota information in off-line state where communication with the server is cut off, updating output quota in the server in accordance with the performed image forming job and initializing the off-line output quota information.

The off-line output quota information may be categorized according to type of job command.

The determining may include, when an available amount of usage is not enough for a type of an input job command, determining whether to perform a job by replacing the available amount with that of another type of job command included in the off-line output quota information.

The method may further include updating the on-line output quota information in the storage unit and the server whenever a predetermined amount of an image forming job is performed.

Exemplary embodiments of the present inventive concept also provide a storage unit which stores off-line output quota information received from an external server; a controller to determine whether to perform a job such that when a job command is input in an on-line state where a communication with the server is available, determines whether to perform the job based on on-line output quota information stored in the server, and when the job command is input in an off-line state where communication with the server is not available, determines whether to perform the job based on the off-line output quota information stored in the storage unit; and an image forming unit to perform an image forming job corresponding to the job command when the controller determines that the job is to be perform.

In an exemplary embodiment, the controller updates output quota in the server in accordance with the performed image forming job and initializes the off-line output quota information when the communication with the server becomes available again after not being available.

In an exemplary embodiment the off-line output quota information is categorized according to a type of job command.

In an exemplary embodiment the controller determines whether to perform a job by replacing an available amount of usage with that of another type of job command included in the off-line output quota information when the available amount of usage is not enough for a type of an input job command.

Exemplary embodiments of the present inventive concept also provide a non-transitory computer readable recording medium containing code to perform a method of controlling an image forming apparatus, the method comprising: connecting to a server where on-line output quota information set for each user is stored; storing off-line output quota information received from the server; when a job command is input in the on-line state where communication with the server is available, determining whether to perform a job based on on-line output quota information stored in the server, and when the job command is input in an off-line state where communication with the server is cut off, determining whether to perform a job based on the off-line output quota information stored in the storage unit; and performing an image forming job corresponding to the job command when the determination is made to perform the job.

In an exemplary embodiment the on-line output quota information and the off-line output quota information includes information regarding an allowed amount of usage, an amount of usage, and an available amount of usage.

In an exemplary embodiment the method further comprises: when communication with the sever becomes available again after an image forming job is performed based on the off-line output quota information in off-line state, updating output quota in the server in accordance with the performed image forming job and initializing the off-line output quota information.

In an exemplary embodiment the determining comprises, when an available amount of usage is not enough for a type of an input job command, determining whether to perform a job by replacing the available amount with that of another type of job command included in the off-line output quota information.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 4 is a view provided to explain on-line output quota information inquiry for each user according to an exemplary embodiment;

FIG. 6 is a view provided to explain off-line output quota information setting according to an exemplary embodiment;

FIG. 7 is a view provided to explain an operation of allocating off-line output quota information to each image forming apparatus according to an exemplary embodiment;

FIG. 9 is a flowchart provided to explain a method of controlling an image forming apparatus according to an exemplary embodiment.

DETAILED DESCRIPTION OF THE PREFERRED EMBODIMENTS

Figure 1:
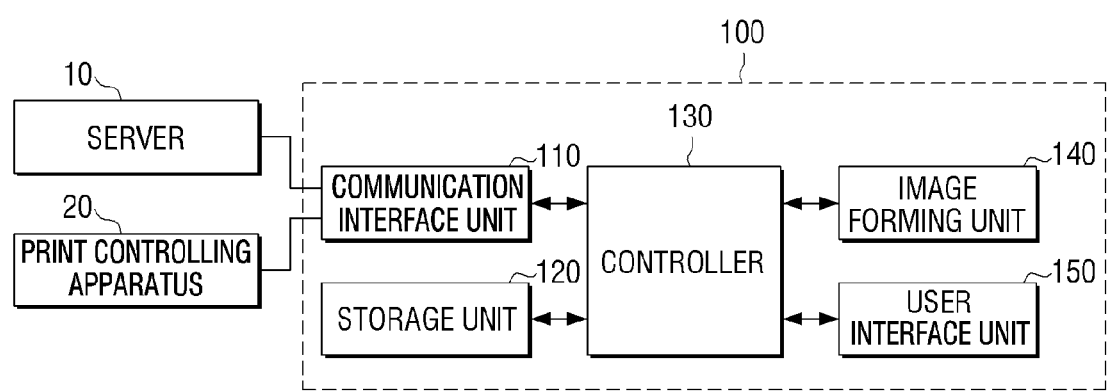
FIG. 1 is an image forming apparatus according to an exemplary embodiment.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is an image forming apparatus according to an exemplary embodiment.

Referring to FIG. 1, an image forming apparatus 100 comprises a communication interface unit 110, a storage unit 120, a controller 130, an image forming unit 140, and a user interface unit 150.

The communication interface unit 110 is connected to a server 10 where information regarding on-line output quota set for each user is stored. In addition, the communication interface unit 110 may receive a user job command and print data from a print controlling apparatus 20.

Herein, the output quota information refers to information to limit output of the image forming apparatus 100, and includes information regarding an allowed amount of output for each user or group, amount of usage, and available amount of usage. The output quota information may be used to determine whether it is possible to perform a job requested from a user.

The output quota information includes on-line output quota information which is used in on-line state where communication with the server 10 is available, and off-line output quota information which is used in an off-line state where communication with the server 10 is cut off.

The on-line output quota information is output quota which is set for each user and group, and may be provided from the server 10 in the on-line state and may be updated and transmitted back to the server 10 according to the job performance result. Business logic, such as charging of each user and group, may be processed based on the on-line output quota information.

On the other hand, the off-line output quota information is also referred to as an off-line quota policy, and may be provided from the server 10 when connection is initiated for the first time and may be stored in the storage unit 120. When communication with the server is cut off, the on-line output quota information cannot be received. In this case, image forming job performance of the image forming apparatus 100 may be limited using the off-line output quota information.

Meanwhile, the communication interface unit 10 may be connected not only through the Local Area Network (LAN) and the Internet network, but also through a Universal Serial Bus (USB) port.

The storage unit 120 stores off-line output quota information received from the server 10 and on-line output quota information set for each user. In addition, the storage unit 120 may store a job command and print data received from the print controlling apparatus 20.

Meanwhile the storage unit 120 may be realized as a storage medium of the image forming apparatus 100 and/or an external storage medium, for example, a removable disk including a USB memory and a web server via the network. In the exemplary embodiment, only one storage unit 120 is illustrated and described, but the storage unit 120 may be divided into a memory to store data and a memory to process commands.

If a job command is input in an on-line state where communication with the server 10 is available, the controller 130 determines whether to perform a job based on the on-line output quota information stored in the server 10, and if a job command is input in the off-line state where the communication with the server 10 is cut off, the controller 130 determines whether to perform a job based on the off-line output quota information stored in the storage unit 120.

Specifically, the controller 130 may confirm the communication connection state with the server 10.

If a user's job command is input in the on-line state, a user authentication procedure of the server 10 is performed, and on-line output quota information of the corresponding user stored in the server 10 is received. The controller 130 compares the available amount of usage which is calculated by subtracting the amount of usage from the allowed amount of usage allocated for each user in the on-line quota information with the requested amount of usage of the job command, and if the requested amount is less than the available amount of usage, the controller 130 may allow performance of the corresponding job. On the other hand, if the requested amount exceeds the available amount of usage, the controller 130 may determine that the corresponding job cannot be performed, and does not allow the performance of the job.

However, in the off-line state, the controller 130 determines whether to perform a job using the off-line output quota information stored in the storage unit 120. As described above, the controller 130 compares the available amount of usage which is calculated by subtracting the amount of usage from the allowed amount of usage allocated for each user in the on-line quota information with the requested amount of usage of the job command, and if the requested amount is less than the available amount of usage, the controller 130 may allow performance of the corresponding job. On the other hand, if the requested amount exceeds the available amount of usage, the controller 130 may determine that the corresponding job cannot be performed, and does not allow the performance of the job.

Meanwhile, the off-line output quota information may be categorized according to the type of job command. Herein, the type of job command may include print color, print mono, copy color, copy mono, scan, fax, and so on.

If the available amount of usage is not enough for the type of an input job command, the controller 130 may determine whether to perform a job by replacing the available amount with that of another type of job command.

For example, suppose that the off-line quota information and the requested amount by a user are as follows, in Table 1 below:

TABLE 1

| | print color | print mono | copy color | copy mono | scan | fax |
|---|---|---|---|---|---|---|
| Quota (allowed amount of usage) | 200 | 120 | 100 | 100 | 100 | 200 |
| Usage (amount of usage) | 100 | 100 | 0 | 0 | 0 | 0 |
| Available (available amount of usage) | 100 | 20 | 100 | 100 | 100 | 100 |
| Request (requested amount of usage) | 30 | 50 | 0 | 0 | 0 | 0 |

The print color job may be covered by the off-line output quota, but 30 pages of the print mono job cannot be covered. In this case, the print mono job can be performed by subtracting 30 pages from the quota of the fax job of which quota remains still high, thus permitting the execution of the user' job command. Herein, the criterion on the order of quota to be subtracted may be transmitted from the server 10.

The quota may be subtracted in a descending order of available amount of usage of each job command type in the image forming apparatus 100. The order of quota of each job command type to be subtracted may be determined by a manager of the server.

Meanwhile, the controller 130 may perform an image forming job based on off-line output quota information in the off-line state where communication with the server 10 is cut off, and then, if communication with the server 10 is resumed, may update the output quota in the server 10 according to the performed image forming job and initialize (reset) the off-line output quota information. Specifically, if an image forming job is performed using the off-line output quota information, the server 10 may be updated based on the performance result. Accordingly, the server 10 may update output quota information for each user based on the amount of usage for a job performed in the off-line state, and thus may avoid an erroneous omission of charging a user for a job performed in the offline state. Herein, the controller 130 may obtain user information without user authentication of the server 10 in the off-line state, based on on-line output quota information for each user which is stored in the on-line state.

Meanwhile, the controller 130 may update on-line output quota information in the storage unit 120 and the server 10 whenever performing a predetermined amount of image forming jobs. For example, the controller 130 may update on-line output quota information every time 10 pages are output and may provide the updated on-line output quota information to the storage unit 120 and to the server 10.

The controller 130 controls each component of the image forming apparatus 100.

If job performance is determined by the controller 130, the image forming unit 140 performs an image forming job corresponding to a job command.

The user interface unit 150 may include a plurality of function keys through which a user may set or select various functions supported by the image forming apparatus 100, and may display various information provided by the image forming apparatus 100. The user interface unit 150 may be realized by combining a monitor and a mouse, or may be realized as an apparatus such as a touch pad which can perform input and output simultaneously.

If a job command is input in the off-line state where communication with the server 10 is cut off, the image forming apparatus 100 may control an image forming job efficiently using off-line output quota information.

Figure 2:
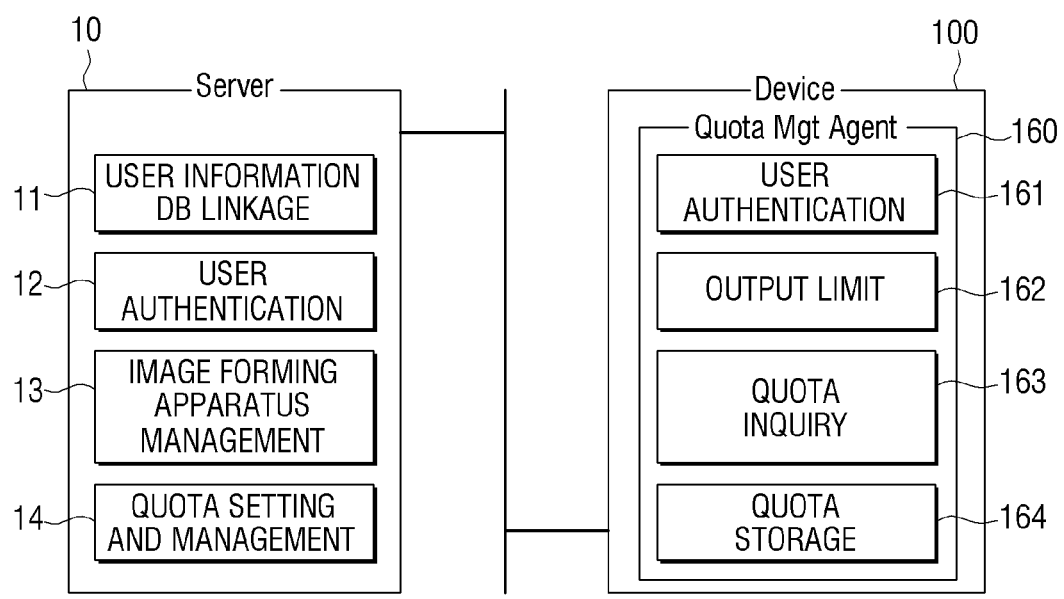
FIG. 2 is a view provided to explain functions of a server and an image forming apparatus according to an exemplary embodiment.

FIG. 2 is a view provided to explain functions of the server 10 and the image forming apparatus 100 according to an exemplary embodiment.

The server 10 may provide functions such as user information Data Base (DB) Linkage 11, user authentication 12, image forming apparatus management 13, and quota setting and management 14.

The function of user information DB linkage 11 refers to the function of storing personal information regarding a user and a group using an MPS system and on-line output quota information. In addition, the server 10 may be interlocked with a user information system of a client (for example, LDAP and so on) to synchronize the user information with the user information DB in real-time or periodically.

The function of user authentication 12 refers to the function of authenticating a user who requests the image forming apparatus 100 to perform a job based on the information of the user information DB.

The function of image forming apparatus management 13 refers to the function of managing the setting and state of at least one image forming apparatus 100 which is connected to the server 10.

The function of quota setting and management 14 refers to the function of transmitting and setting of off-line output quota information, and transmitting, setting and updating on-line output quota information for each user of at least one image forming apparatus 100 which is connected to the server 10.

The function of quota setting and management 14 of the server will be explained in greater detail with reference to FIG. 3.

A quota management agent 160 refers to an application installed in the image forming apparatus 100 and may manage output quota.

Specifically, the quota management agent 160 may perform a user authentication at the User Authentication portion 161, limit output at the Output Limit portion 162, inquire about quota at the Quota Inquiry portion 163, and store quota at the Quota Storage 164.

The function of user authentication 161 refers to the function of requesting the server 10 to perform authentication of a user who requests job performance. If the user is not authenticated, the user may be limited with respect to using the corresponding image forming apparatus 100.

The function of limiting output refers to the function of suspending, canceling or resuming job performance requested by a user arbitrarily.

The function of inquiring quota 163 refers to the function of inquiring off-line output quota information transmitted from the server 10 and on-line output quota information allocated for each user.

The function of storing quota 164 refers to the function of storing off-line output quota information transmitted from the server 10 and on-line output quota information allocated for each user.

The above-mentioned application of quota management agent 160 is stored in the storage unit 120 of the image forming apparatus 100 and may be operated by the controller 130.

Figure 3:
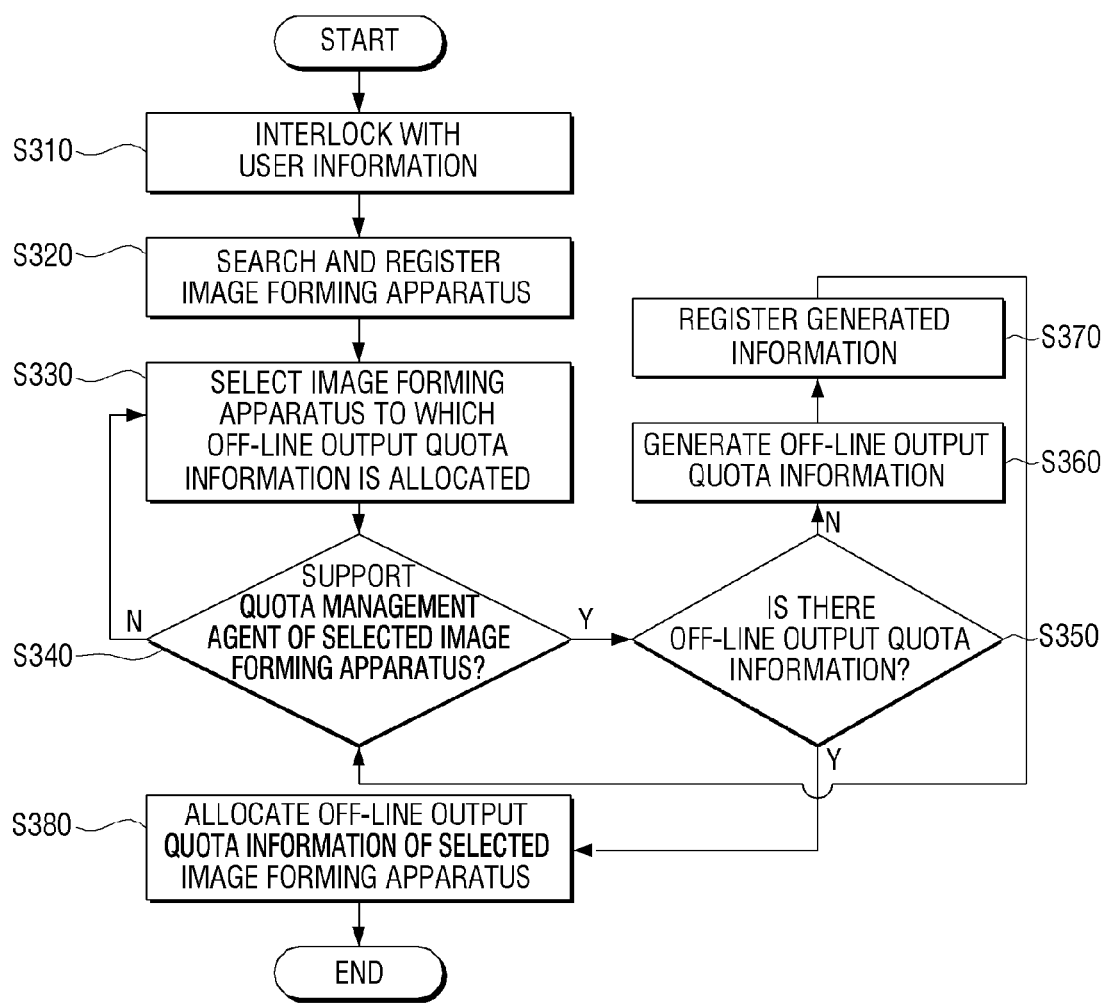
FIG. 3 is a flowchart provided to explain a method of controlling a server according to an exemplary embodiment.

FIG. 3 is a flowchart provided to explain a method of controlling the server 10 according to an exemplary embodiment.

The server 10 may be connected to a user information system of a client to interlock user information DB with user information (operation S310). In addition, the server 10 may search an image forming apparatus 100 which is connected to the server 10 and register the connected image forming apparatus (operation S320).

Subsequently, the server 10 selects the image forming apparatus 100 to which off-line output quota information is allocated (operation S330). Herein, if the selected image forming apparatus 100 supports a quota management agent of the selected image forming apparatus (operation S340:Y) and off-line output quota information does not exist in the selected image forming apparatus 100 (operation S350:N), the server 10 may generate off-line output quota information (operation S360) and register the generated information (operation S370).

In addition, the server 10 may allocate off-line output quota information to the selected image forming apparatus 100 (operation S380).

Through the above method, the server 10 may allocate off-line output quota information to the image forming apparatus 100.

FIG. 4 is a view provided to explain on-line output quota information inquiry for each user according to an exemplary embodiment.

The server 10 may be connected to a user information system of a client to interlock user information DB with user information. FIG. 4 illustrates a user information inquiry screen of the server 10 after the interlocking operation. The user information may include personal (User) information 401 such as a user account, a user name, a group name, an e-mail, etc. and on-line output quota information 402 of the corresponding user.

Figure 5:
FIG. 5 is a view provided to explain information inquiry of an image forming apparatus registered in a server according to an exemplary embodiment.

FIG. 5 is a view provided to explain information inquiry of the image forming apparatus 100 registered in a server according to an exemplary embodiment.

A server manager may search the image forming apparatus 100 to be used by users and register the image forming apparatus 100 in a server. FIG. 5 represents a screen in which the image forming apparatus 100 registered in the server 10 is searched. The information 501 of the image forming apparatus 100 may include basic status, toner status and paper status.

FIG. 6 is a view provided to explain off-line output quota information setting according to an exemplary embodiment.

FIG. 6 illustrates a screen 601 to set off-line output quota information. The off-line output quota information may be set for each type of print job (copy color, copy mono, print color, print mono, fax and scan), and may be set unlimitedly.

In addition, quota may be set regardless of a type of print job (all function).

FIG. 7 is a view provided to explain an operation of allocating off-line output quota information to each image forming apparatus 100 according to an exemplary embodiment.

Referring to FIG. 7, if off-line output quota information is allocated, 'True' is displayed as an allocation state value (operation S701).

Figure 8:
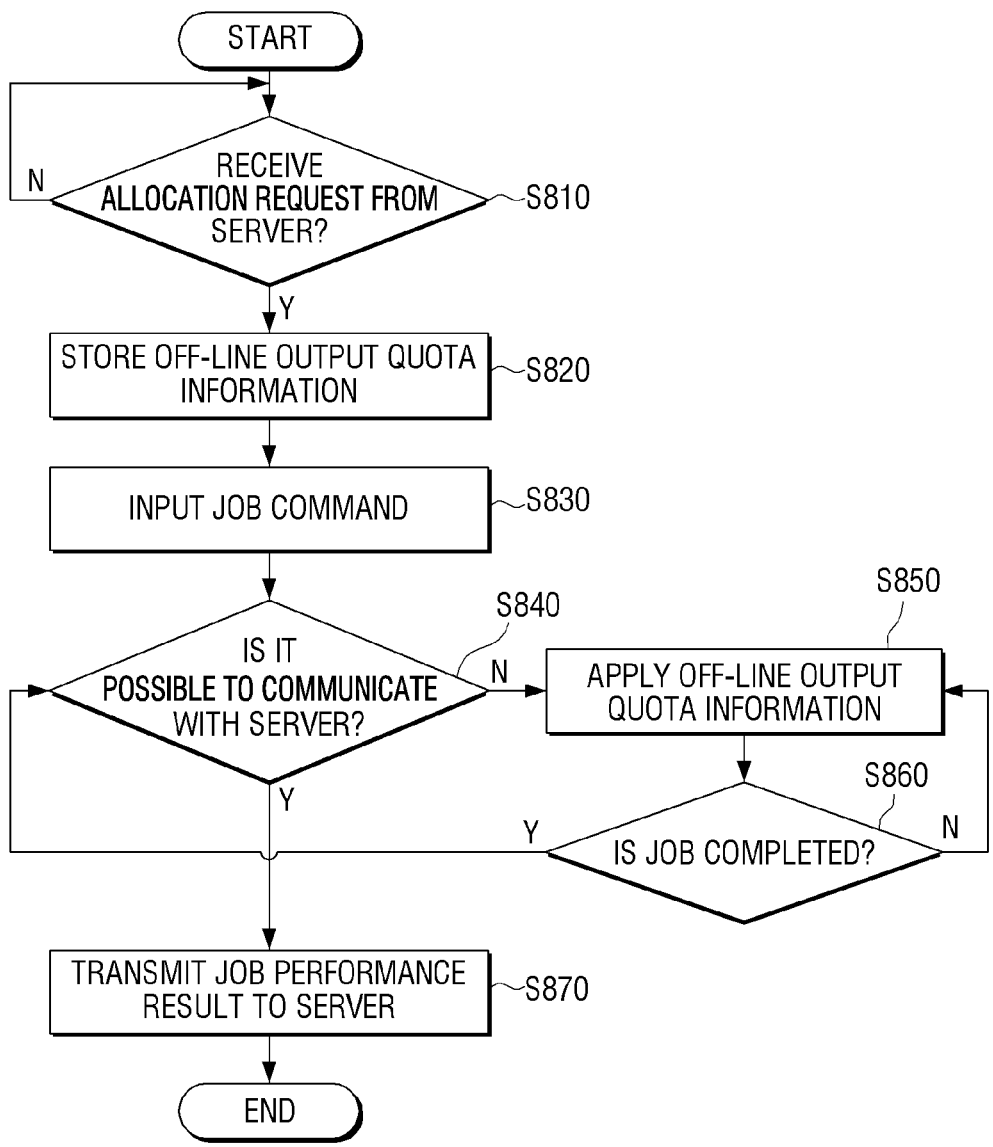
FIG. 8 is a flowchart provided to explain a method of controlling an image forming apparatus according to an exemplary embodiment.

FIG. 8 is a flowchart provided to explain a method of controlling the image forming apparatus 100 according to an exemplary embodiment.

If an allocation request is received from the server 10 (operation S810:Y), the image forming apparatus 100 may store off-line output quota information (operation S820).

Subsequently, if a user's job command is input (operation S830) and communication with the server 10 is possible (operation S840:Y), the job may be performed using on-line output quota information and the performance result may be transmitted to the server 10 (operation S870).

On the other hand, if a user's job command is input (operation S830) and communication with the server 10 is not possible (operation S840:N), an image forming job may be performed by applying the stored off-line output quota information. Subsequently, once the job is completed (operation S860:Y), it is determined whether it is possible to communicate with the server again. If it is determined that communication with the server 10 is once again possible (operation S840:Y), the job performance result may be transmitted to the server 10 (operation S870) to update output quota information for each user.

Meanwhile, the method of controlling an image forming apparatus in FIG. 8 may be performed in the image forming apparatus 100 having the configuration of FIG. 1 and also in image forming apparatuses having other configurations.

FIG. 9 is a flowchart provided to explain a method of controlling an image forming apparatus according to an exemplary embodiment.

According to the method of FIG. 9, off-line output quota information is received from the server 10 (operation S910), and the received off-line output quota information is stored (operation S920).

Subsequently, if a job command is input (operation S930) and communication with the server is available (S940:Y), whether to perform a job may be determined by receiving on-line output quota information of the server 10 (operation S950). Since the operation of determining whether to perform a job has been explained above with reference to FIG. 1, further description of this operation will not be provided.

If it is possible to perform a job (operation S950:Y), the image forming apparatus 100 may perform a job (operation S950:Y), the image forming apparatus 100 may perform an image forming job corresponding to the job command (operation S980).

On the other hand, if it is not possible to perform a job (operation S950:N), the image forming apparatus 100 may display that an image forming job cannot be performed due to output quota limit (operation S970).

Herein, the on-line output quota information may be updated in a storage unit and the server 10 whenever a predetermined amount of an image forming job is performed.

Meanwhile, if a job command is input (operation S930) and communication with the server is not available (operation S940:N), whether to perform a job may be determined using the stored off-line output quota information (operation S960). Since the operation of determining whether to perform a job has been explained above with reference to FIG. 1, further description of this operation will not be provided.

If it is possible to perform a job (operation S960:Y), the image forming apparatus 100 may perform an image forming job corresponding to the job command (operation S980).

On the other hand, if it is not possible to perform a job (operation S960:Y), the image forming apparatus 100 may display that an image forming job cannot be performed due to output quota limit (operation S970).

Herein, if the off-line state is changed to the on-line state, the output quota may be updated in the server in accordance with the performed image forming job, and the off-line output quota information may be initialized.

Meanwhile, the off-line output quota information may be categorized according to the type of job command. If the available amount of usage is not enough for the type of an input job command, whether to perform a job may be determined by replacing the available amount with that of another type of job command included in the off-line output quota information.

Meanwhile, the method of controlling an image forming apparatus in FIG. 9 may be performed in the image forming apparatus 100 having the configuration of FIG. 1, and also in image forming apparatuses having other configurations.

As such, according to various exemplary embodiments, if a job command is input in off-line state where communication with the server 10 is cut off, the image forming apparatus may efficiently control an image forming job using off-line output quota information.

Meanwhile, the methods according to various exemplary embodiments may be stored in various storage media. Accordingly, the methods according to the various exemplary embodiments may be realized in various types of electronic apparatuses executing the storing media.

In addition, the above-described image forming method may be realized as a program including an algorithm executable in a computer, and the program may be stored in a non-transitory computer readable medium and provided therein.

Herein, the non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, and ROM and provided therein.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An image forming apparatus, comprising:
   a communication interface unit which is connected to a server where on-line output quota information set for each user is stored;
   a storage unit which stores off-line output quota information received from the server;
   a controller which, when a job command is input in an on-line state where communication with the server is available, determines whether to perform a job based on on-line output quota information stored in the server, and when the job command is input in an off-line state where communication with the server is cut off, determines whether to perform a job based on the off-line output quota information stored in the storage unit; and
   an image forming unit which, when job performance is determined by the controller, performs an image forming job corresponding to the job command,
   wherein the controller, when an available amount of usage is not enough for a type of an input job command, determines whether to perform a job by replacing the available amount with that of another type of job command included in the off-line output quota information.

2. The apparatus as claimed in claim 1, wherein the on-line output quota information and the off-line output quota information includes information regarding an allowed amount of usage, an amount of usage, and an available amount of usage.

3. The apparatus as claimed in claim 1, wherein the controller, when communication with the sever becomes available again after an image forming job is performed based on the off-line output quota information in the off-line state, updates output quota in the server in accordance with the performed image forming job and initializes the off-line output quota information.

4. The apparatus as claimed in claim 1, wherein the off-line output quota information is categorized according to a type of job command.

5. The apparatus as claimed in claim 1, wherein the controller updates the on-line output quota information in the storage unit and the server whenever a predetermined amount of image forming job is performed.

6. A method of controlling an image forming apparatus, comprising:
   connecting to a server where on-line output quota information set for each user is stored;
   storing off-line output quota information received from the server;
   when a job command is input in the on-line state where communication with the server is available, determining whether to perform a job based on on-line output quota information stored in the server, and when the job command is input in an off-line state where communication with the server is cut off, determining whether to perform a job based on the off-line output quota information stored in the storage unit; and
   performing an image forming job corresponding to the job command when the determination is made to perform the job,
   wherein the off-line output quota information is categorized according to type of job command, and
   wherein the determining comprises, when an available amount of usage is not enough for a type of an input job command, determining whether to perform a job by replacing the available amount with that of another type of job command included in the off-line output quota information.

7. The method as claimed in claim 6, wherein the on-line output quota information and the off-line output quota information includes information regarding an allowed amount of usage, an amount of usage, and an available amount of usage.

8. The method as claimed in claim 6, further comprising:
   when communication with the sever becomes available again after an image forming job is performed based on the off-line output quota information in the off-line state, updating output quota in the server in accordance with the performed image forming job and initializing the off-line output quota information.

9. The method as claimed in claim 6, wherein the off-line output quota information is categorized according to type of job command.

10. The method as claimed in claim 6, further comprising:
    updating the on-line output quota information in the storage unit and the server whenever a predetermined amount of an image forming job is performed.

11. A non-transitory computer readable recording medium containing code to perform a method of controlling an image forming apparatus, the method comprising:
    connecting to a server where on-line output quota information set for each user is stored;
    storing off-line output quota information received from the server;
    when a job command is input in the on-line state where communication with the server is available, determining whether to perform a job based on on-line output quota information stored in the server, and when the job command is input in an off-line state where communication with the server is cut off, determining whether to perform a job based on the off-line output quota information stored in the storage unit; and
    performing an image forming job corresponding to the job command when the determination is made to perform the job,
    wherein the off-line output quota information is allocated by the server separately from the on-line output quota information,
    wherein the determining comprises, when an available amount of usage is not enough for a type of an input job command, determining whether to perform a job by replacing the available amount with that of another type of job command included in the off-line output quota information.

* * * * *